United States Patent
Lieber et al.

[15] 3,701,010
[45] Oct. 24, 1972

[54] METAL WEIGHT COUNTER

[72] Inventors: Hans-Wilhelm Lieber; Rolf Kramer, both of, Berlin, Germany

[73] Assignee: Fernsteuergerate Zacharia - Oelsch - Meier, Berlin, Germany

[22] Filed: June 24, 1970

[21] Appl. No.: 49,494

[30] Foreign Application Priority Data

July 1, 1969    Germany..........P 19 33 261.7

[52] U.S. Cl..............................324/71 R, 177/210
[51] Int. Cl..............................................G01m 27/00
[58] Field of Search.......324/71, 115, 76 A; 177/210, 177/1

[56] References Cited

UNITED STATES PATENTS 1,845,231    2/1932    Browning..................324/71 C
3,196,963    7/1965    Klass et al.................324/71 X
2,880,393    3/1959    Cornish..................324/115 X

*Primary Examiner*—Alfred E. Smith
*Attorney*—Spencer & Kaye

[57] ABSTRACT

An instrument for measuring and indicating the weight of a material, in particular metals, converted in an electrolytic bath. In the instrument a voltage proportional to the current flowing through the bath is measured by means of a voltage divider connected in series with a preferably linearly divided potentiometer. The divider ratio is adapted to the equivalent weight of the particular element being converted, while the sliding contact of the potentiometer is set to compensate for the current efficiency of the particular electrolyte being utilized. The weight of the converted material is indicated by means of a counter mechanism which provides an indication proportional to the voltage at the output of the potentiometer.

7 Claims, 2 Drawing Figures

PATENTED OCT 24 1972 3,701,010

TO ELECTROLYTIC
BATH

TO ELECTROLYTIC
BATH

INVENTORS.
Hans-Wilhelm Lieber
Rolf Kramer

BY Spencer & Kaye
ATTORNEYS.

METAL WEIGHT COUNTER

BACKGROUND OF THE INVENTION

The present invention relates to an instrument for measuring and indicating the weight of a material converted in an electrolytic bath. More particularly the present invention relates to a metal weight counter which is to be used to determine the weight of metals deposited or dissolved in electrolytic baths.

In the electrolysis art, ampere hour counters are increasingly used to control and regulate the baths. When the electrolytic metal deposition takes place with a current efficiency which is close to 100 percent, these ampere hour counters can easily be recalibrated to act as metal weight counters. A known example for this is constituted by the silver weight counters. In numerous electrolytic baths, however, the current efficiency is substantially lower and additionally depends on the actual mode of operation. Thus, in the predominant number of electrolytic baths, the weight of converted metal is calculated with the aid of the measured amounts of electricity, the equivalent weight of the respective material and the current efficiency. This manner of calculating the weight of the converted metal is not only time-consuming, and thus expensive, but it can also be done only by trained personnel.

SUMMARY OF THE INVENTION

It is therefore the object of the present invention to provide a weight counter, and in particular a weight counter for metals, which can be used for all types of baths and which directly indicates the weight of the electrochemically converted metal without complicated calculations.

This object is accomplished according to the preferred embodiment of the present invention in that a voltage divider is connected in parallel with a measuring resistor disposed in a current input lead for the bath, with the division ratio of the voltage divider being adapted to the equivalent weight of the element to be converted in the baths. The output of the voltage divider is connected to a potentiometer which is adjusted in dependence on the current efficiency of the respective electrolyte and a counter is connected to the output of this potentiometer i.e., the sliding contact, which counter provides an indication proportional to the voltage at the output of the potentiometer.

According to a further feature of the invention, the resistors of the voltage divider are disposed in the housing of the metal weight counter in a manner whereby they are exchangeable at any time or preferably are connected thereto by means of plugs. By exchanging the resistors, the metal weight counter according to the present invention can be adapted to any desired type of electrolyte so that the weight of the respective material is always indicated in grams.

In order to assure a true indication of the weight it is necessary to adjust the current efficiency. The present invention provides an advantageous embodiment for this purpose wherein a linearly divided potentiometer is provided with which the separately determined current efficiency can be exactly set. The counting of the weight thus always occurs under consideration of the preset current efficiency.

DESCRIPTION OF THE PREFERRED EMBODIMENTS

Figure 1:
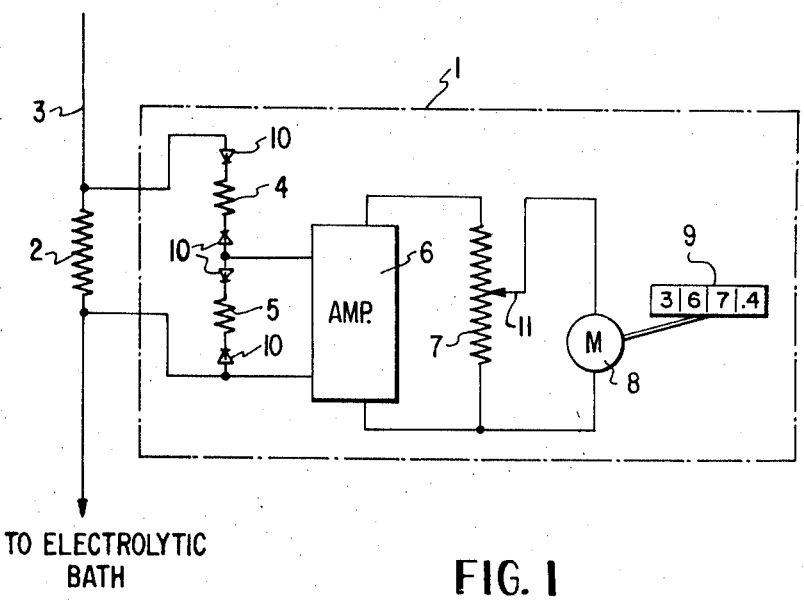
FIG. 1 is a schematic circuit diagram of one embodiment of the metal weight counter according to the present invention.

In FIG. 1, the dot-dash line indicates the housing 1 of the metal weight counter. In this housing all the other elements of the metal weight counter are disposed. The input signal to the metal weight counter, which is proportional to the current flowing through the electrolytic bath, is obtained by detecting the voltage across a known measuring resistor 2 disposed in the current input lead 3 of the electrolytic bath. In order to detect this voltage, the input stage of the weight counter comprises a voltage divider, consisting of resistors 4 and 5, which is connected in parallel with the measuring resistor 2. Since the divider ratio of the voltage divider, and hence the resistors 4 and 5 must be changed for the particular material which is to be weighed, in order to facilitate the changing of the resistors 4 and 5, they are preferably connected into the circuit by means of plug connections shown schematically by the reference numeral 10.

Connected in series with the voltage divider is a measuring amplifier 6, which may, for example, be a transistor amplifier, to whose output is connected a linearly divided potentiometer 7. Connected to the output of potentiometer 7, i.e. the slider 11, is a measuring motor 8 having a counting mechanism 9 mechanically coupled thereto. The measuring amplifier 6 is necessary only when the influence of the resistor 2 at the input leads is to be eliminated or the voltage furnished by the voltage divider is not sufficient to properly operate the measuring motor 8 as a result of the voltage drop at measuring resistor 2 being kept as low as possible.

Figure 2:
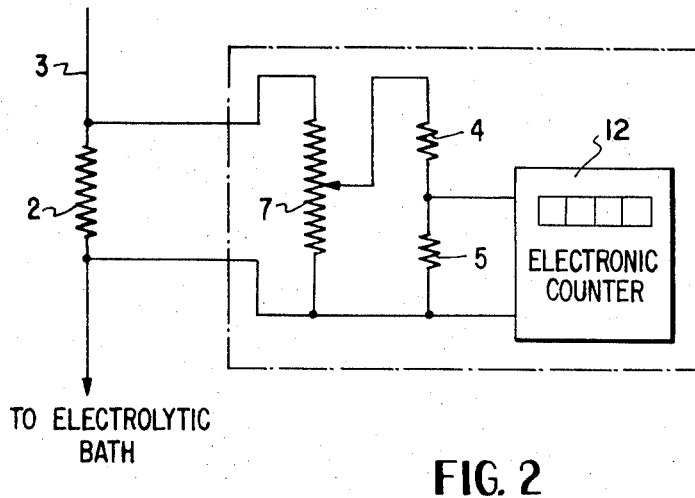
FIG. 2 is a schematic circuit diagram of another embodiment of the invention.

In place of the measuring motor 8 and mechanical counter 9, according to a modification of the invention, an electronic counter 12 (FIG. 2) may be utilized. As further illustrated by the embodiment of FIG. 2, the sequence of the series connection of the voltage divider 4, 5 and the potentiometer 7 may be reversed.

The embodiment of FIG. 1 according to the present invention operates as follows:

In order to measure the weight of the metal, the input terminals of the metal weight counter are connected, for example, across the shunt of an amperemeter which then constitutes the measuring resistor 2. Thereafter the two resistors 4 and 5 are placed into the circuit and proportioned according to the equivalent weight of the particular material to be converted in the electrolytic bath. The two resistors 4 and 5 are here so dimensioned, for example, that their sum will be 1,000 Ω for all materials, i.e. a fixed value. Combinations of resistances for several elements are given in the following table wherein $R_1$ is the resistance of resistor 4; $R_2$ is the resistance of resistor 5; I is the respective ion of a particular material to be converted; G is the weight of the particular material electrochemically converted in 100 amp/h; and U is a voltage at the input to measuring motor 8 which corresponds to a current efficiency of 100 percent. This voltage can be reduced by the potentiometer 7 to correspond to the effective current efficiency.

| I | G[g] | U[V] | $R_1\Omega$ | $R_2\Omega$ |
| --- | --- | --- | --- | --- |
| $Cu^{1+}$ | 237.2 | 4.2696 | 146.1 | 853.9 |
| $Cu^{2+}$ | 118.6 | 2.1348 | 573.0 | 427.0 |
| $Sn^{2+}$ | 221.3 | 3.983 | 203.3 | 796.7 |
| $Sn^{4+}$ | 110.6 | 1.911 | 601.8 | 398.2 |
| $Ag^{1+}$ | 402.4 | 0.724 | 855.1 | 144.9 |
| $Au^{1+}$ | 734.8 | 1.3226 | 735.5 | 264.5 |

This table represents only a few values and is, of course, not exhaustive. It shows the substantial differences of the equivalent weights of copper in a cyanidic bath ($Cu^{1+}$) and in an acid bath ($Cu^{2+}$). Whereas the current efficiency in the acid copper both is almost 100 percent, it lies between 50 and 95 percent in the cyanidic copper bath depending on the operating conditions. The given values for resistances $R_1$ and $R_2$ can be produced with great precision without any particular difficulties.

When gold is used, the two resistances $R_1 = 735.5\ \Omega$ and $R_2 = 264.5\ \Omega$ are thus connected into the circuit and slider 11 of potentiometer 7 is set, depending on the previously determined current efficiency of the bath, which for gold may lie between 25 and 100 percent, so that the voltage at the measuring motor 8 lies between 25 and 100 percent of the voltage $U = 1.3226$ V. When the metal weight counter is in operation the counting mechanism 9 indicates the effective weight of the electrochemically converted gold.

In order to permit simple regulation of the metal weight of individual charges of the material to be processed, the metal weight counter may be provided, according to an additional feature of the present invention, with an additional subtotal counting mechanism which is controlled, for example, by the counter 9 or 11 via a pulse generating device. This subtotal counter mechanism has potential-free contacts which are brought out of the housing of the metal weight counter and are thus available for control purposes. The subtotal counter mechanism may also be coupled with a signal generator whose signal indicates whether a preset metal weight has been reached or exceeded. To reset the subtotal counter mechanism a corrosion resistant key can be employed or the resetting can be accomplished by remote control or automatically.

The description of the present invention has been limited above entirely to a metal weight counter in order to facilitate understanding. For the sake of completeness it should be expressly mentioned, however, that the counter according to the present invention can also be used for counting other weights, such as, for example, the electrophotetic deposition of lacquer (electrodiplacquering), the electrolytic deposition of synthetic particles which carry electric loads because of ionogenic emulsifiers, the electropolymerization of monomers, the electrolytic oxidation, electrolytic cover layer formation, electrolytic deposition of gases and the measurement of the electrochemical material conversions at the electrodes per se, according to Faraday's law.

It will be understood that the above description of the present invention is susceptible to various modifications, changes and adaptations, and the same are intended to be comprehended within the meaning and range of equivalents of the appended claims.

We claim:

1. An instrument for measuring and indicating the weight of the material converted during an electrolytic bath process comprising:
a circuit means having its input terminals connected across a measuring resistor disposed in the current supply lead for said bath, said circuit means including a voltage divider and a potentiometer connected in series between its input and output terminals, with the divider ratio of said voltage divider being related to the equivalent weight of the particular material to be converted in the bath and the slider of said potentiometer being positioned in dependence on the current efficiency of the said electrolytic bath; and, means connected to the output of said circuit means for producing an indication proportional to the voltage at the output of said circuit means, whereby the indication is a measure of the weight of the material converted.

2. The instrument as defined in claim 1 wherein said voltage divider is connected across said measuring resistor, wherein said potentiometer is connected across one of the resistors of said voltage divider, and wherein the slider of said potentiometer is connected to the input of said indicating means.

3. The instrument as defined in claim 1 wherein said material being converted is a metal.

4. The instrument as defined in claim 1, wherein the resistors of said voltage divider are connected in said circuit means via plug-in connections.

5. The instrument as defined in claim 1 wherein the potentiometer is a linear potentiometer.

6. The instrument as defined in claim 1 wherein said indicating means comprises a measuring motor connected to the output of said circuit means and a counting mechanism connected to said motor.

7. The instrument as defined in claim 1 wherein said indicating means is an electronic counter.

* * * * *